Aug. 16, 1960 W. B. G. CRAN 2,949,294
FOLDING MACHINES FOR LAUNDRY FLATWORK
Filed July 9, 1958 7 Sheets-Sheet 1

Inventor
W.B.G. Cran
By Glascos Downing Seebold
Attys

Aug. 16, 1960 W. B. G. CRAN 2,949,294
FOLDING MACHINES FOR LAUNDRY FLATWORK
Filed July 9, 1958 7 Sheets-Sheet 3

Inventor
W.B.G.Cran

Aug. 16, 1960  W. B. G. CRAN  2,949,294
FOLDING MACHINES FOR LAUNDRY FLATWORK
Filed July 9, 1958  7 Sheets-Sheet 4

Inventor
W. B. G. Cran
By Glascock Downing Teebold
Attys.

Inventor
W. B. G. Cran
By Mascot Downing Seebold
Attys

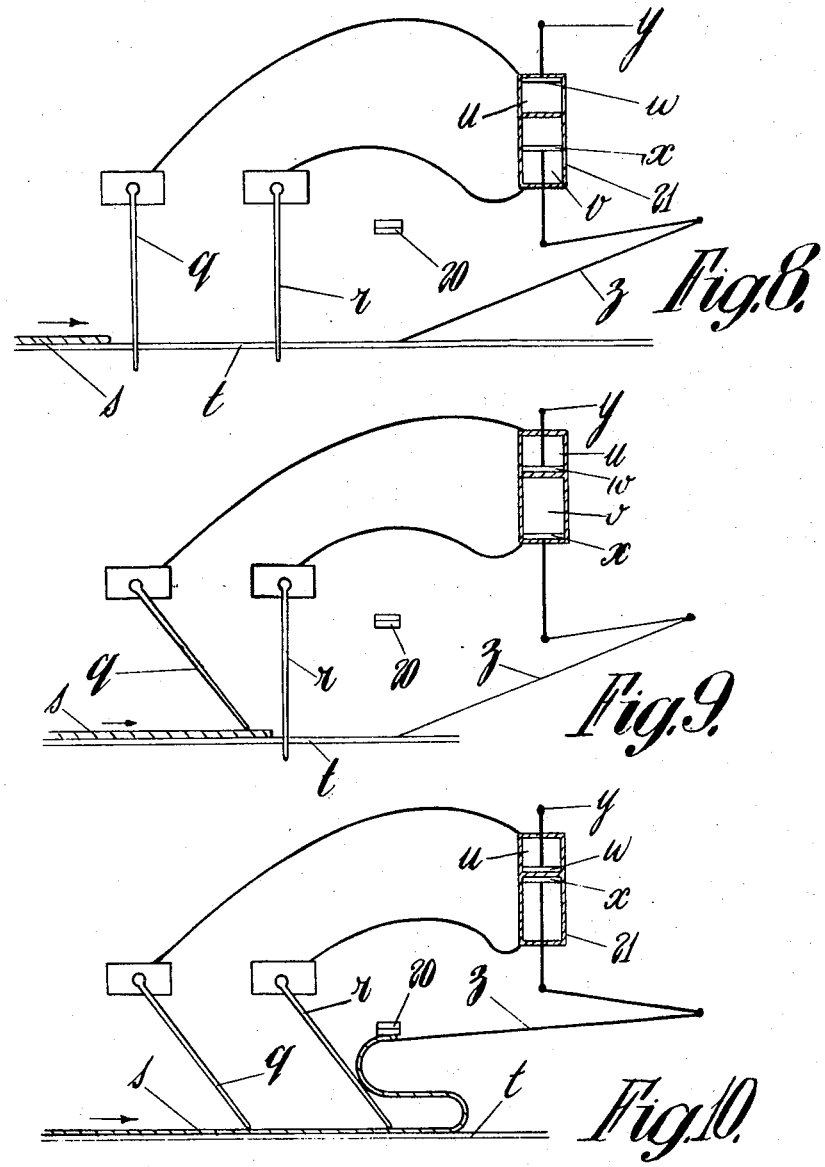

Aug. 16, 1960 W. B. G. CRAN 2,949,294
FOLDING MACHINES FOR LAUNDRY FLATWORK
Filed July 9, 1958 7 Sheets-Sheet 7

Inventor
W. B. G. Cran
By Glascott Downing Liebold
Attys.

United States Patent Office 2,949,294
Patented Aug. 16, 1960

2,949,294

FOLDING MACHINES FOR LAUNDRY FLATWORK

William Broadbent Gordon Cran, Huddersfield, England, assignor to Thomas Broadbent & Sons Limited, Huddersfield, England, a British company Filed July 9, 1958, Ser. No. 747,419

Claims priority, application Great Britain July 16, 1957

7 Claims. (Cl. 270—68)

This invention relates to folding machines for laundry flatwork, and has for its object to provide an improved arrangement of the means by which the leading edge of an article to be folded is gripped and raised so that the folding operation can proceed beneath the said gripped and raised edge.

The present invention consists in a folding machine for laundry flatwork of the type in which the leading edge of the article is lifted by a pick up plate under the control of two feeler arms in the path of the article about to be folded and gripped when in an elevated position whilst the remainder of the article passes beneath such plate to form a fold, wherein the pick up plate which lifts, grips and releases the said leading edge is actuated by two independently controlled but interconnected units, the connection being such that both units must be activated to lift the pick up plate to its uppermost or gripping position whilst when one unit is deactivated the pick up plate falls to a midway position and releases its grip on the article and when the second unit also is deactivated the pick up plate falls to its initial position ready to lift the leading edge of an article.

The invention further comprises a folding machine as aforesaid in which two feeler arms control the circuits of two solenoids actuating the opposite ends of a lever connected at mid-point to the pick up plate adapted to grip the leading edge of the article against a nip bar whilst folding takes place, the said grip being effected when both feeler arms are displaced and both units are operative, whilst when one solenoid becomes de-energised when the trailing edge of the article clears one feeler arm, the lever turns about the other and still energised solenoid as a fulcrum to a mid-position in which the pick up plate ceases to grip the article but is clear of the article being folded, the pick up plate falling fully to its initial position when the article clears both feeler arms and the second solenoid also becomes de-energised.

The invention further comprises a folding machine as aforesaid in which the actuating units are pressure fluid cylinders with pistons therein connected to the ends of the lever, the feeler arms controlling the flow of fluid pressure to and from the cylinders.

The invention further comprises a folding machine as aforesaid in which two feeler arms control the flow of fluid pressure to and from the actuating units which are pneumatic or hydraulic cylinders with pistons therein operatively connected and arranged so that the piston rod of one cylinder is attached to a fixed point and the piston rod of the second cylinder is connected to a pick up plate adapted to grip the leading edge of the article against a nip bar whilst folding takes place, the said grip being effected when both feeler arms are displaced by the article and admit fluid pressure to both units thus making them operative, the pressure being released from one unit when the trailing edge of the article clears one feeler arm thus allowing the pick up plate to fall to a mid position in which it is above and clear of the article being folded, the pick up plate falling fully to its initial position when the article clears both feeler arms and pressure is released also from the second unit.

The invention further comprises a folding machine as aforesaid in which the actuating units are solenoids connected together, with the plunger of one attached to a fixed point and the plunger of the other attached to the pick up plate.

The invention further comprises a folding machine as aforesaid in which the feeler arm which is first displaced by an article passing to the folding mechanism controls an actuating unit of shorter operating stroke and the other feeler arm controls an actuating unit of longer operating stroke.

Referring to the accompanying explanatory drawings:
Figure 1 is a sectional side elevation and Figure 2 a front view of a pick-up and clamping mechanism for an article to be folded, arranged in one convenient form in accordance with this invention.

Figures 8–12 show a pneumatically operated pick-up plate.

Figure 4 is a diagrammatic illustration of the device showing the feeler arms of the mechanism in their out of service positions, and the pick-up plate in position to pick up the leading edge of an article.

Figure 5 is a diagrammatic illustration of the device showing a feeler arm engaged by an article but the pick-up plate remains in the same position as in Figure 4.

Figure 6 is a diagrammatic illustration of the device showing both feeler arms displaced by an article on the conveyor and the pick-up plate is raised to press the leading edge of the article against a nip plate.

Figure 7 is a diagrammatic illustration of the device showing the article after it has passed one feeler arm and the pick-up plate has released its grip on the forward end of the article.

Figure 8 is a diagrammatic showing of a pneumatically operated device showing both feeler arms clear of the article and pneumatic means controlled by the positions of said arms cause the pick-up plate to occupy a position ready to pick up the leading edge of an article moving along the conveyor.

Figure 9 is a diagrammatic view similar to Figure 8 showing one feeler arm displaced by an article but the position of the pick-up plate is unaffected by this.

Figure 10 is a diagrammatic view similar to Figures 8 and 9 showing both feeler arms displaced by an article and the pick-up plate is raised to grip the leading edge of the article against a nip plate.

Figure 11 is a diagrammatic view similar to Figures 8, 9 and 10 showing the article after it has passed one feeler arm and the pick-up plate has released its grip on the forward end of the article.

Figure 12 is a diagrammatic view identical to Figure 8 showing both feeler arms clear of the article and the pick-up plate is returned to a position on the conveyor ready to pick up the next article.

Figure 2:
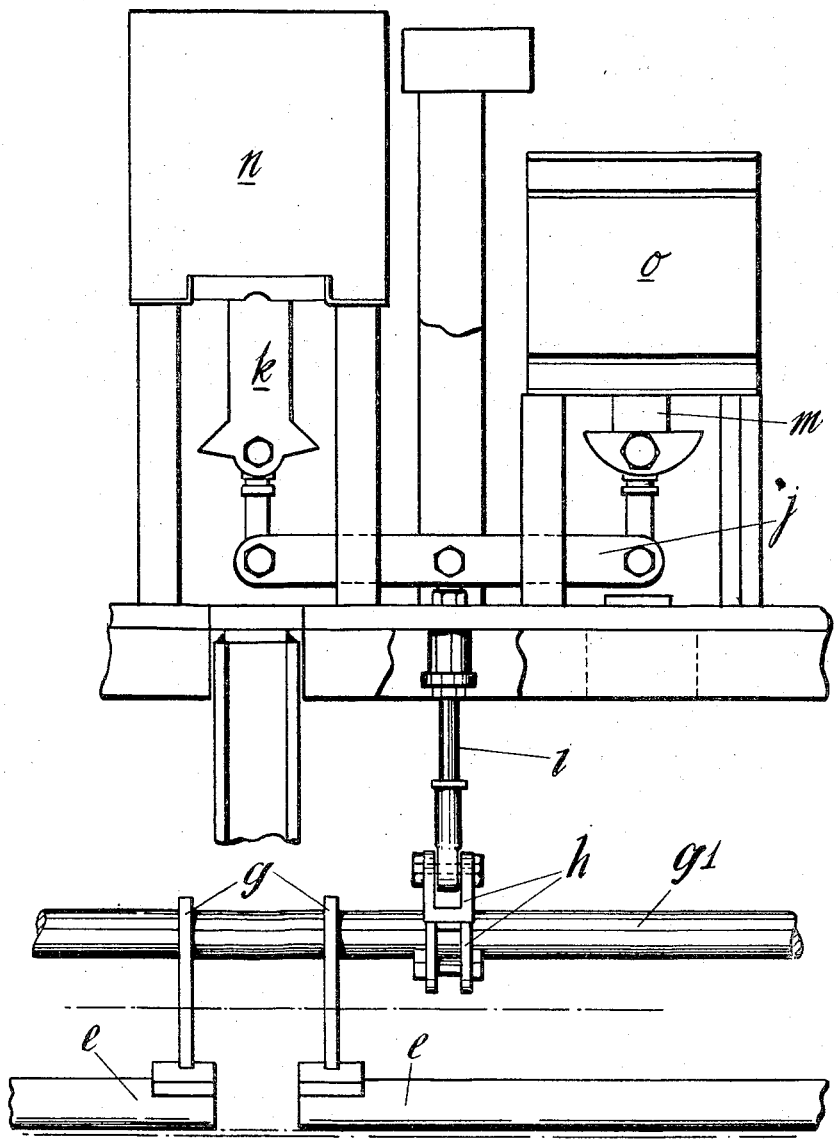

The laundry flatwork articles as $a$ are carried forward by an endless conveyor $b$ consisting of a number of belts spaced laterally from one another. The said articles $a$ are adapted in their movement towards the folding position to engage successively pivoted feeler arms $c$, $d$ which control the movements of pick up plates $e$ which are adapted to grip the leading edge of the article against a fixed nip bar $f$. The pick up plates $e$ are mounted upon the arms $g$ secured upon a shaft $g^1$ (Figure 2) extending across the folding machine. Such shaft has secured thereto a number of arms $h$, to each of which a spring $h^1$ is coupled to counterbalance partly the weight of the pick-up plate $e$ and its operating mechanism.

Each arm $h$ is coupled to a pivoted suspension link $i$ which at its upper end is connected to a mid point 31 of a lever $j$. The latter in the illustrated example is operated upon at its ends by the armature $k$, $m$ of two solenoids $n$ and $o$.

The movement of the feeler arm $c$ controls an electric circuit which energises the small or short stroke solenoid $o$ and the movement of the feeler arm $d$ controls an electric circuit which energises the large or long stroke solenoid $n$.

Figure 4:
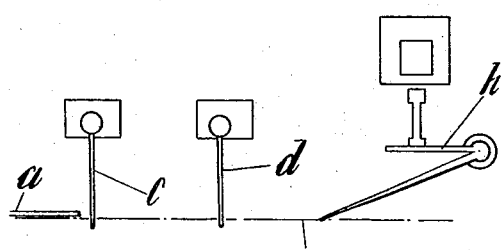
Figures 4–7 show an electrically operated pick-up plate.
Figure 4A:
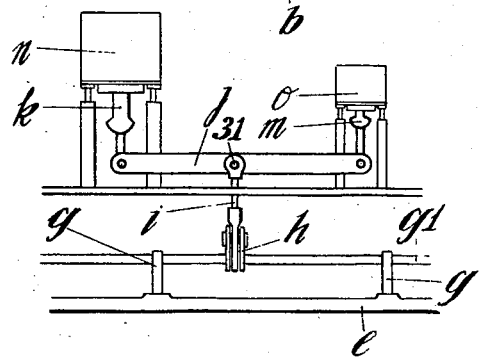
Figure 4a is a view similar to Figure 4 but at right angles thereto.

In Figures 4 and 4a, the feeler arms $c$, $d$ are in their out-of-service positions and their lower ends pass into the gap between two belts of the endless conveyor $b$. The pickup plate $e$ is in its lower position riding on the conveyor and ready to pick up the leading edge of an article. Both solenoids $n$ and $o$ are de-energised so that the lever $j$ is in its lowered position.

Figure 5:
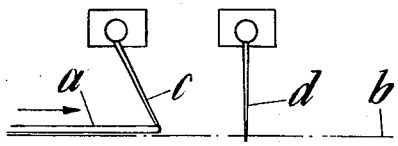
Figure 5A:
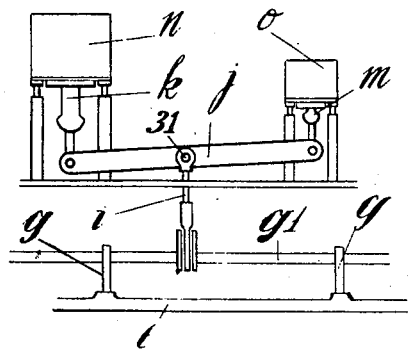
Figure 5a is a view similar to Figure 5 but at right angles thereto.

In Figures 5 and 5a, the feeler arm $c$ has been engaged by the article $a$ on the conveyor $b$ and has been displaced, resulting in the closing of the circuit of the small solenoid $o$ which is energised. This has no effect on the position of the pick up plate $e$, the lever $j$ turning about its pivotal connection to the link $i$. The armature of the large solenoid is free to move as this solenoid is not energised.

Figure 3:
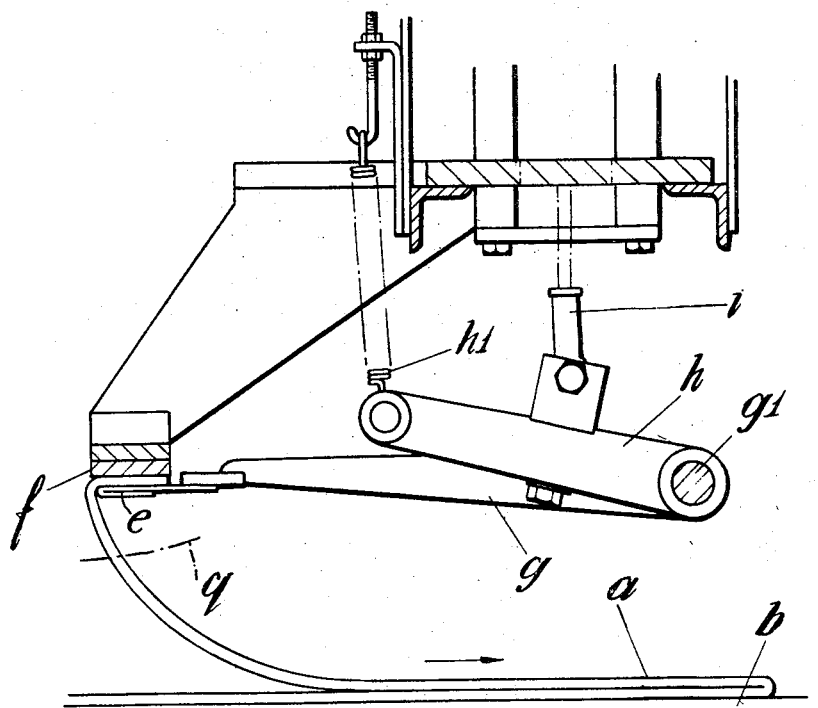
Figure 3 shows the edge of the article which is being folded in its clamped position.
Figure 6:
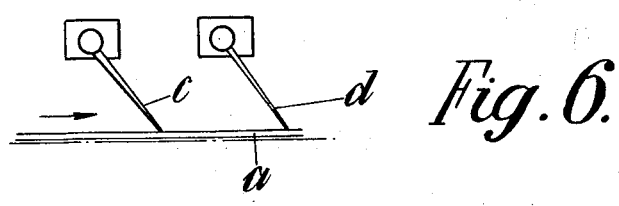
Figure 6A:
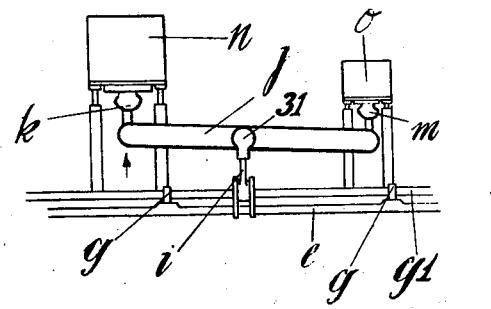
Figure 6a is a view similar to Figure 6 but at right angles thereto.

In Figures 6 and 6a, both feeler arms $c$, $d$ are displaced by the article $a$ resulting in the energising of both the small and the large solenoids $o$ and $n$ respectively with the result that the lever is raised about the armature of the small solenoid as a fulcrum and turns the shaft $g$ sufficiently to cause the pick up plate $e$ to raise the leading edge of the article $a$ when it gets on to the pick up plate and press it against the nip bar $f$. The conveyor $b$ then propels the article $a$ beneath the pick up plate, as shown in Figure 3, so that the article is folded.

Figure 7:
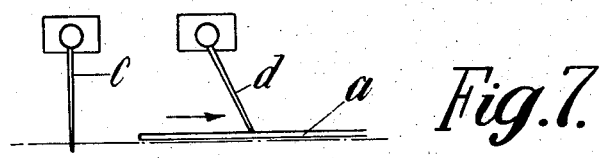
Figure 7A:
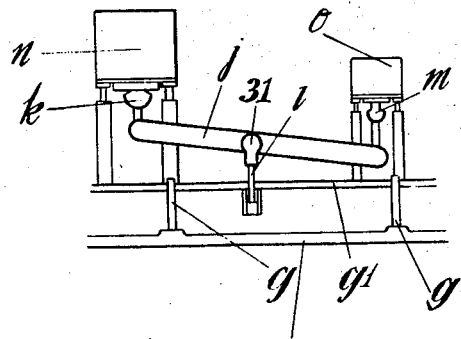
Figure 7a is a view similar to Figure 7 but at right angles thereto.

In Figures 7 and 7a, the article $a$ has passed or moved clear of the feeler arm $c$, so that the small solenoid $o$ is de-energised and its armature falls on to a stop. This allows the pick up plate $e$ to release its grip on the forward end of the article so that the folded article can travel clear of the pick-up plate $e$ and nip bar $f$, but whilst the large solenoid $n$ remains energised, the pick up plate can only fall to the position indicated by a dotted line $q$ in Figures 1, 2 and 3 which prevents the article being trapped beneath the pick up plate.

Figure 1:
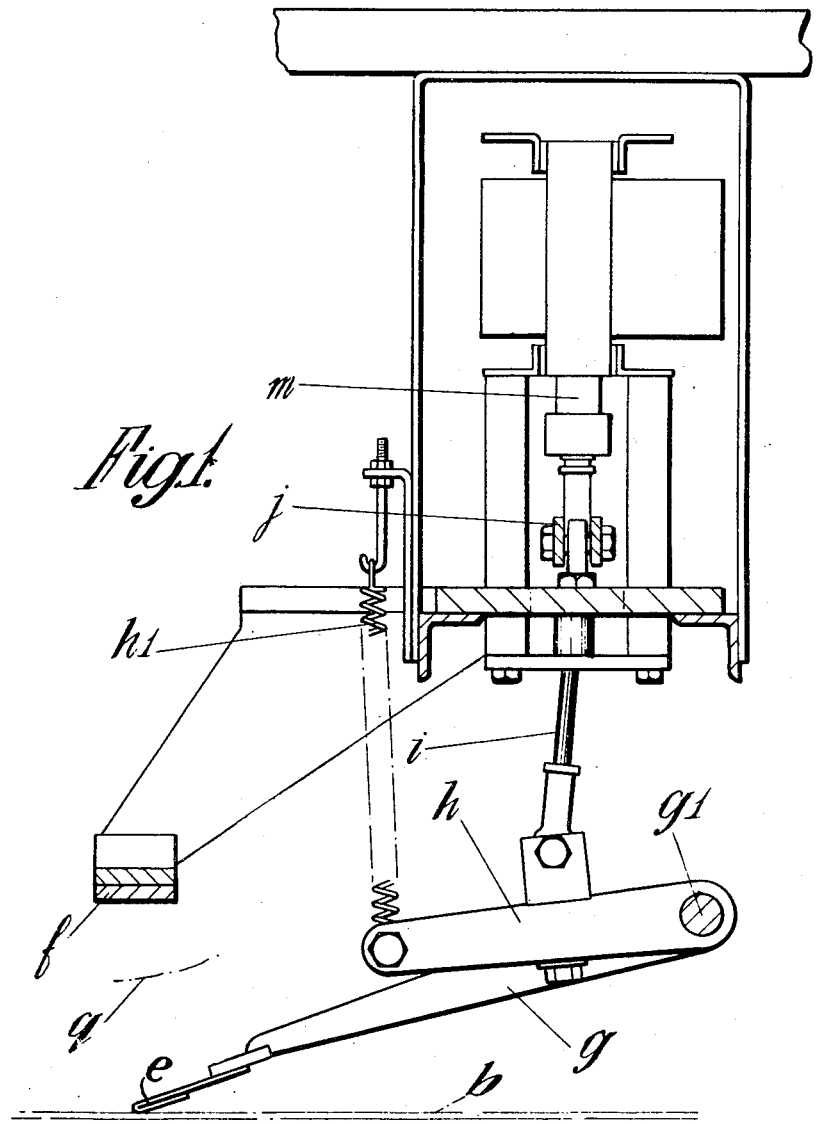

When the article $a$ passes clear of the feeler arm $d$, the large solenoid $n$ is de-energized and the feeler plate $e$ then descends fully on to the conveyor as shown in Figure 1, ready to raise the leading edge of the next article $a$.

Figure 13:
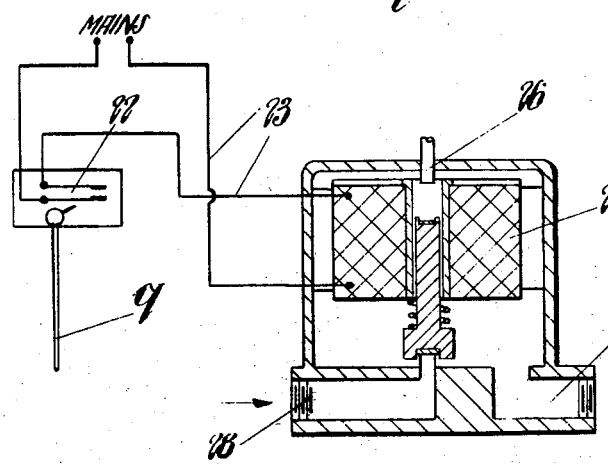
Figure 13 is a diagrammatic view of an arrangement of solenoid operated valve operated by a feeler arm for use with the device as shown in Figures 8 to 12.

It will be appreciated that in place of two solenoids, two air cylinders could be used, the feeler arms opening and closing circuits energising solenoids operating air valves to the two cylinders. When such valves are not being operated, the cylinders exhaust to atomsphere. The pistons in the cylinders are connected to the ends of a lever as $j$. A hydraulic system similarly controlled could be used in place of a pneumatic system but the operation of both pneumatic and hydraulic systems is precisely similar to the electrical system hereinbefore described. Figure 13 shows a feeler arm controlled solenoid. The important feature is that when the article passes clear of the first feeler arm as in Figure 7, the lever $j$ is allowed to fall only sufficiently to release the grip of the pick-up plate $e$ on the leading edge of the article, but the said pick up plate does not fall fully so that the folding operation can be completed. Finally when the trailing edge of the article clears the feeler arm $d$, the other end of the lever $j$ falls and so the pick up plate returns to its original position ready to deal with the leading edge of a subsequent article to be folded.

It will be appreciated that there are usually several sets of feeler arms, solenoids and pick up plates in the width of a folding machine. The folding operation is a usual one but the control of the pick up plate as herein set forth constitutes a great improvement in the art.

In Figures 8 to 12, there are two feeler arms $q$, $r$ arranged as in Figures 4–7, such arms being displaced by the articles to be folded which is moved forward on the conveyor $t$. The said feeler arms control the flow of compressed air to and its escape from a cylinder having upper and lower portions $u$ and $v$ with a piston as $w$, $x$ in each of the portions. The piston $w$ is anchored at $y$ to a fixed point and the piston $x$ is connected to a pick up plate $z$. 20 indicates the nip.

In Figure 8, both arms $q$ and $r$ are clear of the article $s$ and both portions of the cylinder are under atmospheric pressure.

In Figure 9, the feeler arm $q$ is displaced by the article $s$ and this results in compressed air being passed to the upper side of the anchored piston $w$. The effect of such pressure is to raise the cylinder 21 but this does not affect the position of the piston $x$ and the pick up plate $z$.

In Figure 10, both feeler arms $q$ and $r$ are displaced by the article $s$ and compressed air is now caused to act on the underside of piston $x$ with the result that the leading edge of the article $s$ is gripped by the pick up plate $z$ against the nip bar 20.

Figure 11:
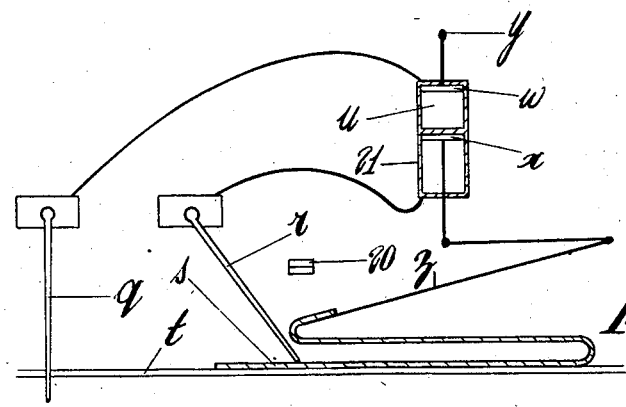

In Figure 11, the article $s$ has moved clear of the feeler arm $q$ so that the upper side of the piston $w$ is under atmospheric pressure which allows the cylinder 21 to fall until it is supported by the piston $w$. This allows the pick up plate $z$ to release the leading edge of the article $s$ from between the pick up plate and grip bar 20 but the pick up plate $z$ cannot fall on to the part of the article $s$ beneath the pick up plate.

Figure 12:
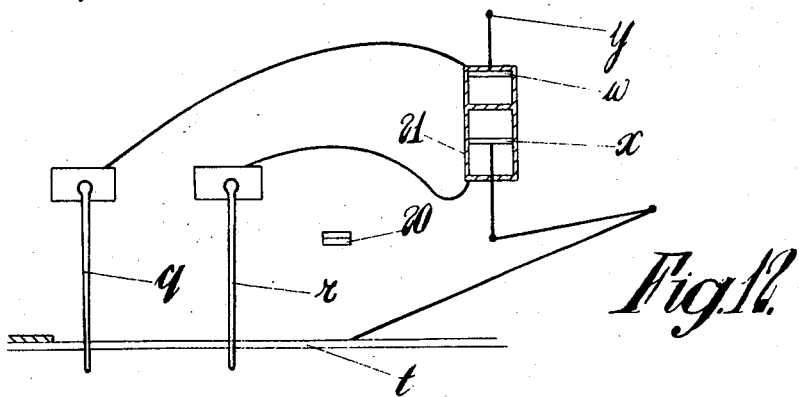

In Figure 12, both feeler arms $q$ and $r$ are clear of the folded article $s$ and the pick up plate is allowed to drop on to the conveyor $t$, which is the position also shown in Figure 8.

In Figure 13, a feeler arm $q$ is shown in a neutral position and an electric switch 22 which it operates is open. Such a switch is in a main circuit 23 which includes a solenoid coil 24 held in a cover 25 having an exhaust to atmosphere connection 26, a connection 27 to the space above the piston $w$ in Figures 8–12 and a valve controlled connection 28 to a source of air pressure. The valve 29 is spring loaded and its stem forms the armature of the solenoid so that when the latter is energised the valve 29 is lifted from its seat and the top of the valve stem closes the exhaust or atmospheric connection 26. Compressed air then passes to the upper side of the piston $w$. The solenoid 24 is energised when the feeler arm is moved by the article $s$ (Figures 8–12) and closes the switch 22. When the feeler arm is free, the switch 22 opens and the solenoid is de-energised and the parts are in the positions shown in Figure 13.

The arrangement shown in Figure 13, could serve as a hydraulic control unit and can be used where a pneumatic or hydraulic unit is substituted for a solenoid in Figures 1–7.

Instead of using two pneumatic or hydraulic pistons in a common cylinder as shown in Figures 8–13, two solenoids may be used, one armature being connected to a fixed point and the other armature being connected to the pick up plate. The action will be the same as with the arrangement shown in Figures 8–13.

It will be noted that in both the device of Figures 1 to 7a and the device of Figs. 8 to 12 there is a lost motion means between the two lifting means so that upon actuation of one of the lifting means o in Fig. 5a the lost motion is taken up, and in Fig. 9 upon actuation of u, w the lost motion is taken up so that when lifting means n in Figure 6 or v, x in Figure 10 is actuated the lifting plate e in Fig. 7 or z in Fig. 10 is raised against the gripper bar. Upon deactivation of o or u, w the lifting plate will descend the distance accounted for by the lost motion.

With the present improvement, it is unnecessary to employ latching mechanism to prevent the pick up plate falling prematurely and trapping the article a before folding is completed, as only the small solenoid is de-energized and the pick up plate held in a mid-position, until the article has passed both feeler arms.

What is claimed is:

1. In a folding machine for laundry flatwork, a conveyor for carrying flatwork to be folded, a lifting plate normally lying on said conveyor to receive the leading edge of flatwork to be folded, a lifting device for said lifting plate comprising a lever, two lifting means, one operatively associated with each end of said lever, means connecting said lifting plate with the center of said lever, means including a pair of feeler arms in the path of flatwork approaching said lifting plate arranged for successive operation of said lifting means by said flatwork on said conveyor, a gripper bar located above said lifting plate positioned so that the leading edge of flatwork lifted by said lifting plate will be gripped and held when both said lifting means are actuated and the first of said lifting means lifting one end of said lever through a shorter vertical distance, and the second of said lifting means lifting the other end of said lever a greater vertical distance, whereby upon deactivation of said first lifting means the flatwork may be released from said gripping bar without returning said lifting plate to its original position.

2. In a folding machine for laundry flatwork, a conveyor for carrying flatwork to be folded, a lifting plate normally lying on said conveyor to receive the leading edge of flatwork to be folded, a gripper bar located above said lifting plate position so that the leading edge of flatwork lifted by said lifting plate will be gripped and held when both said lifting means are actuated, a lifting device connected to said lifting plate, first lifting means, second lifting means, said first and second lift means being connected together with a lost motion means therebetween, comprising means including first and second feeler means in the path of flatwork approaching said lifting plate arranged for successive operation of said lifting means by said flatwork on said conveyor, said first lifting means being first actuated by said first feeler means and arranged to take up said lost motion, said second lifting means being subsequently actuated by said second feeler means to effect lifting of said lifting plate against said gripper bar to clamp said flatwork, said first feeler means being first deactivated by the trailing edge of said flatwork causing said lifting plate to descend the distance of said lost motion to release said flatwork from gripping said flatwork, whereby upon deactivation of said first lifting means the flatwork may be released from said gripping bar without returning said lifting plate to its original position.

3. The folding machine of claim 2, in which said lifting means are solenoids.

4. The folding machine of claim 2, in which said lifting means are pressure actuated cylinder and piston means.

5. The folding machine of claim 1, in which said first lifting means is operated by the feeler arm first actuated by contact with an article to be folded.

6. A folding machine of the type in which the leading edge of an article of laundry flat work carried along a conveyor is picked up and held in elevated position while the article to be folded passes beneath the said leading edge, including a pair of feeler arms located for successive operation in the path of the articles on the conveyor, a pair of lifting means corresponding, respectively, to said feeler arms, an electric circuit for each said lifting means actuated by movement of the corresponding feeler arm to actuate the corresponding lifting means, a lever extending between said two lifting means and arranged so that upon movement of each said feeler arm the corresponding lifting means lifts the corresponding end of said lever, a pick-up plate adapted to grip the leading edge of an article to be folded, said pick-up plate being secured to the center of said lever for operation upwardly to grip an article to be folded under the influence of both said lifting means and, upon deactivation of one of said electric circuits, one lifting means will lower one end of said lever and thereby lower said pick-up plate to a mid position where the pick-up plate ceases to grip the article but is clear of the article being folded and, upon de-energization of the other electric circuit, the pick-up plate will be lowered to its initial position.

7. A folding machine for laundry flatwork of the type including a conveyor, means located above the top surface of said conveyor to pick up and hold the leading edge of the article to be folded while the article to be folded passes thereunder, including a pick-up plate normally lying against the top surface of said conveyor a pair of feeler means for successive actuation by an article to be folded as it passes along the conveyor toward said means to pick up the leading edge of said article to be folded, said means to raise and lower said pick-up plate comprising a pair of solenoid operated air valves each operated by one of said feeler means, a first piston fixed to the machine above the pick-up plate, a second piston fixed to the pick-up plate, a cylinder having an upper chamber portion in which said first piston operates and a lower chamber portion in which said second piston operates, each of said chamber portions being connected to a corresponding one of said air valves whereby, upon operation of both said air valves under the influence of both said feeler means, said pick-up plate is actuated to grasp and pick up the leading edge of a piece to be folded and subsequently, under the influence of only one of said feeler means, said pick-up plate is lowered to release the said leading edge.

References Cited in the file of this patent

UNITED STATES PATENTS

| | | |
|---|---|---|
| 2,811,350 | Cran et al. | Oct. 29, 1957 |
| 2,815,946 | Cran | Dec. 10, 1957 |